(12) United States Patent
Du

(10) Patent No.: US 9,014,166 B2
(45) Date of Patent: Apr. 21, 2015

(54) METHOD FOR TRANSMITTING SYSTEM INFORMATION

(75) Inventor: Zhongda Du, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 620 days.

(21) Appl. No.: 13/000,045

(22) PCT Filed: Dec. 12, 2008

(86) PCT No.: PCT/CN2008/073493
§ 371 (c)(1),
(2), (4) Date: Dec. 20, 2010

(87) PCT Pub. No.: WO2010/000119
PCT Pub. Date: Jan. 7, 2010

(65) Prior Publication Data
US 2011/0090895 A1 Apr. 21, 2011

(30) Foreign Application Priority Data

Jul. 3, 2008 (CN) .......................... 2008 1 0137822

(51) Int. Cl.
*H04J 3/00* (2006.01)
*H04W 4/00* (2009.01)
*H04J 3/06* (2006.01)
*H04W 48/08* (2009.01)

(52) U.S. Cl.
CPC .................................... *H04W 48/08* (2013.01)

(58) Field of Classification Search
USPC ................................................ 370/329, 509
See application file for complete search history.

(56) References Cited

U.S. PATENT DOCUMENTS

2002/0021718 A1* 2/2002 Kerhuel et al. ............... 370/509
2009/0252077 A1* 10/2009 Khandekar et al. ........... 370/312
2009/0262693 A1* 10/2009 Wang et al. ................... 370/329

FOREIGN PATENT DOCUMENTS

| CN | 1505416 A | 6/2004 |
| CN | 1741634 A | 3/2006 |
| WO | 2007024110 A1 | 3/2007 |

OTHER PUBLICATIONS

NTT DOCOMO, Inc., "Text Proposal for System Information Sharing", "3GPP TSG RAN WG2 #62; Tdoc-R2-082740", May 5-9, 2008, pp. 12, Published in: Kansas City, USA.
ZTE, "System Information Scheduling", "3GPP TSG RAN WG2 RRC adhoc; R2-082941", Jun. 5-Jul. 6, 2008, pp. 13, Published in: Sophia Antipolis, France.
ZTE CMCC, "Scheduling Issue for Window Size of 1ms", "3GPP TSG RAN WG2 Meeting #62bis; R2-083217", Jun. 30-Jul. 4, 2008, pp. 14, Published in: Warsaw, Poland.

* cited by examiner

*Primary Examiner* — Kiet G Tang
(74) *Attorney, Agent, or Firm* — Hultquist, PLLC; Steven J. Hultquist; Mary B. Grant

(57) ABSTRACT

The present invention provides a method for transmitting system information, wherein the SIs are transmitted in their respective windows, and the windows do not overlap with each other, when the windows is equal to 1 millisecond, system information blocks are mapped into SIs and the number of the SIs is smaller than or equal to 5. Through this method, the initial wireless sub-frame of the transmitting window of the system information is configured to have offsets, so that the transmitting conflict between SI and SIB1 can be avoided.

5 Claims, 2 Drawing Sheets

METHOD FOR TRANSMITTING SYSTEM INFORMATION

CROSS-REFERENCE TO RELATED APPLICATIONS

This application is a U.S. national phase application under the provisions of 35 U.S.C. §371 of International Patent Application No. PCT/CN08/73493 filed Dec. 12, 2008, which in turn claims priority of Chinese Patent Application No. 200810137822.9 filed Jul. 3, 2008. The disclosures of such international patent application and Chinese patent application are hereby incorporated herein by reference in their respective entireties, for all purposes.

TECHNICAL FIELD

The present invention relates to communication field, more specifically, to a method for transmitting system information.

BACKGROUND OF THE INVENTION

In the long-term evolution (LTE) system, system information may be divided into main information block (MIB), system information block 1 (SIB1) and ordinary system information (SI).

Wherein the MIB is transmitted in a broadcasting channel with a transmitting cycle of 40 milliseconds, and the MIB is repeatedly transmitted in sub-frame #0 of each wireless frame within its transmitting cycle. SIB1 is transmitted in a downlink shared channel with a scheduling cycle of 80 milliseconds, and SIB1 is repeatedly transmitted in sub-frame #5 (sub-frame number starts from 0) of a wireless frame satisfying SFN % 2=0 (wherein SFN is the system frame name) within its scheduling cycle; and other system parameters are included in other system information blocks (SIB). In respect of other SIBs, there are already SIBs from SIB2 to SIB8 in the present LTE system. The contents of system parameters comprise service cell information, cell reselection information and adjacent cell information of intra-frequency, inter-frequency and other radio access technologies (RAT) etc.

The above SIBs are mapped into different SIs to realize scheduling, that is, the SIBs are defined according to their contents, wherein SI serves as a scheduling unit, the scheduling information of these SIs are included in SIB1, and the scheduling information specifically comprises a transmitting window w, a scheduling cycle n and so on. The order that the SI appears in the scheduling information of SIB1 is called as scheduling order n, the transmitting windows of all SIs are the same, but the scheduling cycles may be different. The transmitting window of the SI is a limited time range, within which the SIBs mapped into the same SI are repeatedly transmitted, but it is not determined in which sub-frame the transmission is conducted, that is, a terminal needs to try to receive and decode the SI in each sub-frame within the transmitting window. In the LTE system, to simplify the scheduling process, the relation between the scheduling cycles N of all SIs is in general that one is simply multiple of another, and they all have even number of frames. For example, the scheduling cycle N may be 8 frames, 16 frames and so on, which makes a certain SFN to become a common multiple of some SIs, i.e. satisfying SFN % Ni=0. To facilitate description, the above SI is called SI group on the SFN in the following description.

The scheduling rule of SI is described as follows: supposing that the size of the transmitting window is w sub-frames, the scheduling cycle of a certain SI is N and the scheduling order thereof is n, then the starting wireless frame and sub-frame of the transmitting window of the system information may be represented by the following formulae: SFN % N=COUNT+floor(w*(n−1)/10), sub-frame=(w*(n−1)) % 10, wherein COUNT is a constant and may be 0 or 8 for example. If COUNT is larger than or equal to N, then COUNT shall be modified to be COUNT % N. It can be seen that when n=1, sub-frame=0, that is, the transmitting window of SI with n=1 begins from sub-frame #0 of the wireless frame satisfying SFN % N=COUNT. For the SIs with n larger than 1, following the SI with n=1, they shall be continuously transmitted within their respective transmitting windows in sequence. For example, it is assumed that there are 7 SIBs all together, i.e. SIB2, SIB3, SIB4, SIB5, SIB6, SIB7 and SIB8, and these SIBs are mapped into 7 SIs, i.e. SI-2, SI-3, SI-4, SI-5, SI-6, SI-7 and SI-8, in a one-to-one manner and their scheduling cycles are 160 ms, 320 ms, 640 ms, 640 ms, 1280 ms, 1280 ms and 1280 ms, respectively. FIG. 1 is a schematic diagram showing the scheduling rule of each SIB above, wherein the transmitting window is 20 ms and COUNT=0. As shown in FIG. 1, the SI group on SFN=0 comprises SI-2, SI-3, SI-4, SI-5, SI-6, SI-7 and SI-8, the transmitting window of SI-2 begins from sub-frame #0 of SFN #0, and other SIs are continuously transmitted within their respective 20 ms transmitting windows in sequence. The SI group on SFN=32 comprises SI-2 and SI-3; the SI groups on SFN=16 and SFN=48 comprise SI-2; and the SI group on SFN=64 comprises SI-2, SI-3, SI-4 and SI-5.

Since the scheduling cycle of SIB1 is 80 ms and SIB1 is transmitted on fixed wireless frames and sub-frames, SIB1 is allowed to be transmitted within transmitting windows of other SI in order to facilitate the scheduling of other SI. However, it is specified in the LTE system that other SIs are not allowed to be transmitted in sub-frame #5 satisfying SFN % 2=0 in order to avoid mixing SIB1 and other SIs on the same sub-frame.

At present, the size of the transmitting window of the SI ranges among (1 ms, 2 ms, 5 ms, 10 ms, 15 ms, 20 ms, 40 ms, spare) in the LTE system, wherein when the size of the transmitting window is 1 ms, according to the present scheduling rule, a phenomena will appear that the transmissions of SIB1 and other SIs overlap with each other within the same sub-frame when the number of the scheduled SIs is larger than or equal to 6. FIG. 2 is a schematic diagram showing the phenomena that the transmissions of SIB1 and other SIs overlaps with each other within the same sub-frame. As shown in FIG. 2, the SI group on frame #0 is transmitted within successive sub-frames beginning from sub-frame #0 of wireless frame #0. Since the scheduled SI-7 is transmitted in sub-frame #5 of wireless frame #0, it conflicts with the transmission of SIB1.

SUMMARY OF THE INVENTION

The present invention aims at providing an improved method for transmitting system information to solve the problem that the transmissions of SIB1 and other SIs overlap with each other within the same sub-frame stated above.

To solve the above problem, the present invention provides a method for transmitting system information, wherein the SIs are transmitted in their respective windows, and the windows do not overlap with each other, when the windows is equal to 1 millisecond, system information blocks (SIBs) must be mapped into SIs and the number of the SIs is smaller than or equal to 5. The SIs here do not include an SI with a fixed scheduling rule, and the SI with a fixed rule comprises a main information block and a system information block 1.

When the windows are equal to 1 millisecond, the SIs are transmitted before the sub-frame which is used to transmit a system information block 1. The sub-frame which is used to transmit the system information block 1 is sub-frame #5 of a wireless frame satisfying SFN % 2=0. The wireless frame where the SIs are located satisfies a scheduling rule of the SIs and a scheduling rule of the system information block 1.

In virtue of the above technical scheme, in the present invention, when the window is equal to 1 millisecond, the number of the SIs scheduled is smaller than or equal to 5 and the scheduling of the transmitting window of the system information is restricted to be before the sub-frame transmitting SIB1, so that transmitting conflict between the SI and SIB1 can be avoided.

DETAILED DESCRIPTION OF THE PREFERRED EMBODIMENTS

Summary of the function

According to the present scheduling rule, when the number of the scheduled SIs is larger than or equal to 6, a phenomena appears that the transmissions of SIB1 and other SIs overlap with each other within the same sub-frame. Therefore, in the technical scheme provided by the embodiments of the present invention, when a window is equal to 1 millisecond, the number of the SIs scheduled is smaller than or equal to 5 and the scheduling of the transmitting window of the system information is restricted to be before the sub-frame transmitting SIB1, so that the above problem can be avoided.

A detailed description is given to the preferred embodiments of the invention with reference to the accompanying drawings. The preferred embodiment of the present invention is described for the purpose of illustration, not for limiting the present invention, and the embodiments of the present invention and the features of the embodiments can be combined with each other if there is no conflict.

In an embodiment of the present invention, a method for transmitting SI is provided. The SIs concerned in the embodiment of the present invention are transmitted in their respective windows which do not overlap with each other. Additionally, it shall be stated that the SIs here does not include those with a fixed scheduling rule. The SI with a fixed scheduling rule comprises a main information block and a system information block 1.

In the embodiments of the present invention, when a window is equal to 1 millisecond, system information blocks shall be mapped into the SIs, the number of which is smaller than or equal to 5. Wherein when the window is equal to 1 millisecond, the SI is transmitted before the sub-frame which is used to transmit system information block 1. The sub-frame which is used to transmit system information block 1 is sub-frame #5 of a wireless frame satisfying SFN % 2=0. The wireless frame where the SI is located satisfies the scheduling rule of the SI and the scheduling rule of system information block 1.

It can be seen from the above description that, compared with the existing technologies, in the present invention, when the window is equal to 1 millisecond, the number of the SIs is smaller than or equal to 5, and the scheduling of the transmitting window of the SI is restricted to be before the sub-frame transmitting SIB1, so that the problem that the transmissions of SIB1 and other SIs overlap with each other within the same sub-frame can be avoided.

The present invention shall be illustrated in combination with embodiments in details as follows.

Embodiment 1

Figure 1:
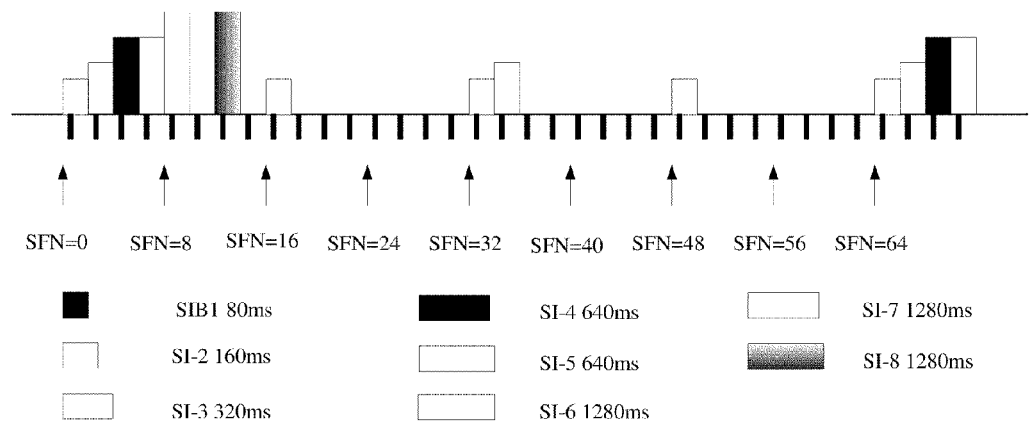
FIG. 1 is a schematic diagram showing the scheduling rule of the SIB according to relative technologies.
Figure 2:
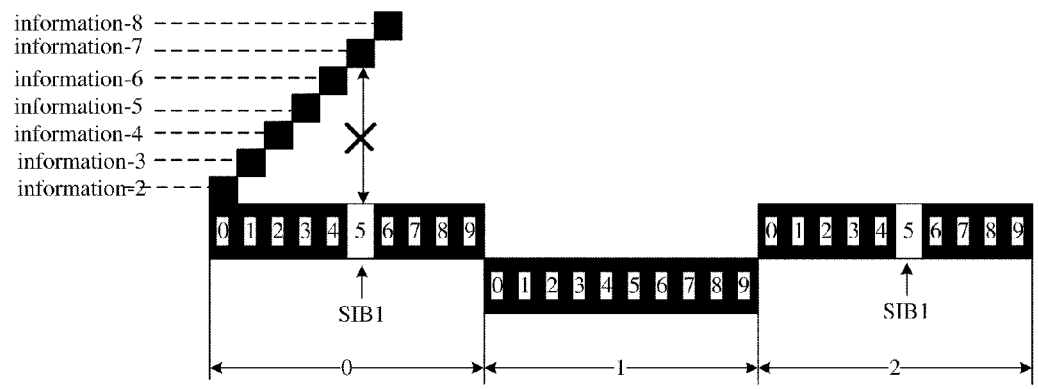
FIG. 2 is a schematic diagram showing the case that the transmission of SIB1 and other SI overlaps each other within the same sub-frame according to relative technologies.
Figure 3:
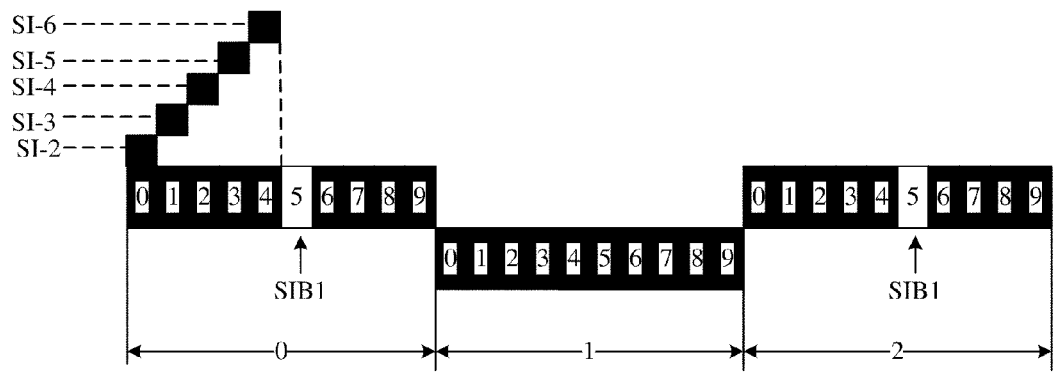
FIG. 3 is a schematic diagram showing the transmitting position of SIB1 and other SI in a wireless frame in the method for transmitting system information according to embodiment 1 of the present invention.

FIG. 3 is a schematic diagram showing the transmitting position of SIB1 and other SIs in a wireless frame in the method for transmitting system information according to embodiment 1 of the present invention, wherein the size of the window is configured to be 1 millisecond.

In the present embodiment, SIB1 system and seven system information blocks (i.e. SIB2, SIB 3, SIB4, SIB5, SIB6, SIB7, SIB8) are configured, and these SIBs are mapped into five SIs (i.e. SI-2, SI-3, SI-4, SI-5, SI-6). The mapping relation between the SIBs and the SIs as well as the cycle of the SI are illustrated as follows:

SIB2 and SIB3 are mapped into SI-2, and the cycle of SI-2 is 160 milliseconds;

SIB4 and SIB5 are mapped into SI-3, and the cycle of SI-3 is 320 milliseconds;

SIB6 is mapped into SI-4, and the cycle of SI-4 is 320 milliseconds;

SIB7 is mapped into SI-5, and the cycle of SI-5 is 640 milliseconds;

SIB8 is mapped into SI-6, and the cycle of SI-6 is 1280 milliseconds.

As shown in FIG. 3, SIB1 is transmitted in sub-frame #5 of frames #0 and #2. Since frame #0 satisfies the condition of SFN % N=0, all SIs in the present embodiment may be transmitted starting from frame #0, wherein N is the scheduling cycle of the SI. Since the windows are equal to 1 millisecond and arranged in a successive manner, all SIs in the present embodiment are respectively transmitted in sub-frames #0, #1, #2, #3, #4 so as to avoid the conflict problem of sub-frame #5 which is used to transmit SIB1.

Embodiment 2

Figure 4:
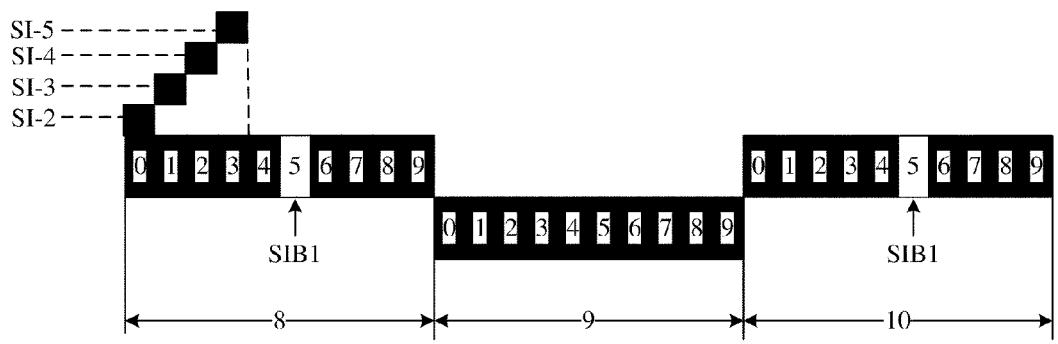
FIG. 4 is a schematic diagram showing the transmitting position of SIB1 and other SI in a wireless frame in the receiving method for system information according to embodiment 2 of the present invention.

FIG. 4 is a schematic diagram showing the transmitting position of SIB1 and other SIs in a wireless frame in the method for transmitting SI according to embodiment 2 of the present invention, wherein the size of the window is configured to be 1 millisecond.

In the present embodiment, SIB1 system and seven system information blocks (i.e. SIB2, SIB 3, SIB4, SIB5, SIB6, SIB7, SIB8) are configured, and these SIBs are mapped into four SIs (i.e. SI-2, SI-3, SI-4, SI-5). The mapping relation between the SIBs and the SIs as well as the cycle of the SI are illustrated as follows:

SIB2 and SIB3 are mapped into SI-2, and the cycle of SI-2 is 160 milliseconds;

SIB4 and SIB5 are mapped into SI-3, and the cycle of SI-3 is 320 milliseconds;

SIB6 and SIB7 are mapped into SI-4, and the cycle of SI-4 is 320 milliseconds;

SIB8 is mapped into SI-5, and the cycle of SI-5 is 640 milliseconds.

As shown in FIG. 4, SIB1 is transmitted in sub-frame #5 of frames #8 and #10. Since frame #8 satisfies the condition of SFN % N=8, all SIs in the present embodiment may be transmitted starting from frame #8, wherein N is the scheduling cycle of the system information. Since the windows are equal to 1 millisecond and arranged in a successive manner, all SIs in the present embodiment are respectively transmitted in sub-frames #0, #1, #2, #3 so as to avoid the conflict problem of sub-frame #5 which is used to transmit SIB1.

To sum up, compared with the existing technologies, in the present invention, when the window is equal to 1 millisecond, the number of SIs scheduled is smaller than or equal to 5 and the scheduling of the transmitting window of the SIs is restricted to be before the sub-frame transmitting SIB1, so as to avoid the problem that the transmissions of SIB1 and other SIs overlap with each other within the same sub-frame.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. A method for transmitting system information (SI), wherein SIs are transmitted in respective time domain windows, comprising:
   when the time domain windows are equal to 1 millisecond, mapping system information blocks into SIs, wherein the number of the SIs which the system information blocks are mapped into is less than or equal to 5; and
   transmitting the SIs in the respective time domain windows, wherein the time domain windows do not overlap with each other;
   wherein when the time domain windows are equal to 1 millisecond, the SIs are transmitted before a sub-frame which is used to transmit a system information block 1.

2. The method according to claim 1, wherein the SIs do not include an SI with a fixed scheduling rule.

3. The method according to claim 2, wherein each SI with the fixed scheduling rule comprises a main information block and a system information block 1.

4. The method according to claim 1, wherein the sub-frame which is used to transmit the system information block 1 is sub-frame #5 of a wireless frame satisfying system frame number (SFN) % 2=0.

5. The method according to claim 1, wherein a wireless frame where the SIs are located satisfies a scheduling rule of the SIs and a scheduling rule of the system information block 1.

* * * * *